US009537626B2

(12) United States Patent
Lou

(10) Patent No.: US 9,537,626 B2
(45) Date of Patent: Jan. 3, 2017

(54) METHOD AND APPARATUS FOR DETERMINING COORDINATED MULTI-POINT TRANSMISSION/RECEPTION COORDINATION SET

(71) Applicant: HUAWEI TECHNOLOGIES CO., LTD., Shenzhen, Guangdong (CN)

(72) Inventor: Qunfang Lou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 160 days.

(21) Appl. No.: 14/515,654

(22) Filed: Oct. 16, 2014

(65) Prior Publication Data
US 2015/0036628 A1    Feb. 5, 2015

Related U.S. Application Data

(63) Continuation of application No. PCT/CN2012/074180, filed on Apr. 17, 2012.

(51) Int. Cl.
*H04W 4/00* (2009.01)
*H04L 5/00* (2006.01)
(Continued)

(52) U.S. Cl.
CPC ........ *H04L 5/0035* (2013.01); *H04W 72/0426* (2013.01); *H04B 7/024* (2013.01); *H04W 72/0453* (2013.01)

(58) Field of Classification Search
CPC ........ H04W 24/02; H04W 16/24; H04W 8/18; H04W 4/00; H04W 72/12; H04W 72/121; H04B 7/02; H04B 7/024; H04B 7/0452; H04L 5/00; H04L 5/0035
(Continued)

(56) References Cited

U.S. PATENT DOCUMENTS

| 9,281,876 B2 * | 3/2016 | Burstrom ................ H04W 4/00 |
| 2010/0238821 A1 | 9/2010 | Liu et al. |
| 2013/0301422 A1 * | 11/2013 | Caretti ................ H04B 1/1027 370/241 |

FOREIGN PATENT DOCUMENTS

| CN | 101998351 | 3/2011 |
| CN | 102316510 | 1/2012 |

(Continued)

OTHER PUBLICATIONS

Chinese Office Action dated Jul. 1, 2014 in corresponding Chinese Patent Application No. 201280000458.6.
(Continued)

*Primary Examiner* — Hanh N Nguyen
(74) *Attorney, Agent, or Firm* — Staas & Halsey LLP

(57) ABSTRACT

Embodiments of the present invention provide a method and an apparatus for determining a coordinated multi-point transmission/reception CoMP coordination set, which can increase an interference suppression gain during CoMP. The method includes: receiving, by a first cell, CoMP resource block information of a second cell sent by the second cell, where the CoMP resource block information of the second cell indicates a CoMP resource block of the second cell; obtaining, by the first cell, a CoMP coordination set of each CoMP resource block of the first cell according to CoMP resource blocks of the first cell and the CoMP resource blocks of the second cell; and determining, by the first cell, that a union set of CoMP coordination sets of all the CoMP resource blocks of the first cell is a CoMP coordination set of the first cell.

14 Claims, 4 Drawing Sheets

(51) Int. Cl.
*H04W 72/04* (2009.01)
*H04B 7/02* (2006.01)

(58) Field of Classification Search
USPC ............... 370/468, 328–330, 203–210, 338, 390,370/395.21
See application file for complete search history.

(56) References Cited

FOREIGN PATENT DOCUMENTS

| | | |
|---|---|---|
| CN | 102395163 | 3/2012 |
| EP | 2590450 A1 | 5/2013 |
| WO | 2011/088018 A2 | 7/2011 |

OTHER PUBLICATIONS

PCT International Search Report dated Jan. 31, 2013 in corresponding International Patent Application No. PCT/CN2012/074180.
Garcia et al., "Distributed Dynamic CoMP for LTE-Advanced", Short PPT document version, Agenda 15.2, 3GPP RAN1 #58, Shenzhen, China, Aug. 2009, pp. 1-15.
Tokyo Institute of Technology, KDDI, "Distributed Dynamic CoMP for LTE-Advanced", 3GPP TSG RAN WG1 Meeting #58, Shenzen, China, Aug. 2009, pp. 1-18.

\* cited by examiner

METHOD AND APPARATUS FOR DETERMINING COORDINATED MULTI-POINT TRANSMISSION/RECEPTION COORDINATION SET

CROSS-REFERENCE TO RELATED APPLICATIONS

This application is a continuation of International Application No. PCT/CN2012/074180, filed on Apr. 17, 2012, which is hereby incorporated by reference in its entirety.

TECHNICAL FIELD

The present invention relates to the field of communications technologies, and in particular, to a method and an apparatus for determining a coordinated multi-point transmission/reception coordination set.

BACKGROUND

CoMP (Coordinated Multi-point Transmission/reception, coordinated multi-point transmission/reception) is one of key technologies of LTE-A (Long Term Evolution-Advanced, Long Term Evolution-Advanced), and is used to expand high data rate coverage, increase the average system throughput, and improve the performance for cell edge users.

The CoMP technology is a technology in which a UE (User Equipment, user equipment) can simultaneously receive signals from a serving cell and a coordination cell or a UE send signals to a serving cell and a coordination cell, which is equivalent to increasing a quantity of antennas of a transmit end or a receive end, so as to improve the communication performance by inputting and outputting signals through a plurality of paths.

The key to implementing coordinated multi-point transmission/reception lies in selection of a coordination cell, that is, selection of a CoMP coordination set of a UE.

In the prior art, a CoMP coordination set may be determined according to a difference between a strength value of a signal of a serving cell received by a user in the serving cell and a strength value of a signal of another cell except the serving cell received by the user or a difference between a path loss from a user in a serving cell to the serving cell and a path loss from the user to another cell except the serving cell. Specifically, the determining a CoMP coordination set according a difference between a strength value of a signal of a serving cell received by a user in the serving cell and a strength value of a signal of another cell except the serving cell received by the user is described. Referring to FIG. 1, three neighboring cells Sector 0, Sector 1, and Sector 2 are included. If the cells Sector 0, Sector 1, and Sector 2 include users UE0, UE1, and UE2, respectively. Sector 0 obtains strength of a signal of Sector 0 received by UE0 and strength of signals of Sector 1 and Sector 2 received by UE0. Assuming that a difference between the strength of the signal received from Sector 0 and the strength of the signal received from Sector 1 is smaller than a preset threshold, there is a high possibility that UE0 is located in a boundary area of Sector 0, and the cell Sector 0 performs coordinated multi-point transmission/reception for UE0; therefore, it can be determined that UE0 is a CoMP user of Sector 0, and it can be determined that Sector 1 is a coordination cell of UE0 and is used for performing coordinated multi-point transmission/reception for UE0. Assuming that a difference between the strength of the signal received from Sector 0 and the strength of the signal received from Sector 2 is greater than the preset threshold, the neighboring cell Sector 2 may not be preliminarily selected as a coordination cell of UE0. Therefore, in this scenario, a CoMP coordination set of UE0 includes the coordination cell Sector 1. Correspondingly, Sector 1 and Sector 2 also use the same method to determine CoMP users within respective coverage areas and CoMP coordination sets of the CoMP users.

Therefore, a user performing CoMP in a serving cell is referred to as a CoMP user in the serving cell.

However, in the prior art, it is determined, only based on the consideration of signal enhancement, that a cell causing great interference to a CoMP user is a coordination cell of the CoMP user. In such a selection manner, a factor of interference is not taken into consideration. In practice, interference of a serving cell is generally greatly different from interference of another cell; therefore, a user and a coordination set that are selected according to a difference between strength values of signals of the serving cell and another cell are generally not a user and a coordination set which help achieve a great gain during CoMP, which reduces the effect of CoMP.

SUMMARY

Embodiments of the present invention provide a method and an apparatus for determining a coordinated multi-point transmission/reception coordination set, which can be used for determining a coordination set for increasing an interference suppression gain during CoMP.

Further, the embodiments of the present invention provide a coordinated multi-point transmission/reception method and apparatus. The CoMP method performs CoMP based on a coordination set that is determined by using the foregoing method for determining a coordinated multi-point transmission/reception coordination set, so that an interference suppression gain can be increased during CoMP, thereby improving system performance.

According to one aspect, a method for determining a CoMP coordination set is provided. The method includes:

receiving, by a first cell, coordinated multi-point transmission/reception CoMP resource block information of a second cell sent by the second cell, where the CoMP resource block information of the second cell indicates a CoMP resource block of the second cell, the CoMP resource block of the second cell is a resource block allocated to a CoMP user of the second cell, and a CoMP coordination set of the CoMP user of the second cell includes the first cell;

obtaining, by the first cell, a CoMP coordination set of each CoMP resource block of the first cell according to CoMP resource blocks of the first cell and the CoMP resource block of the second cell, where the CoMP coordination set of each CoMP resource block is a set of second cells including the CoMP resource block, and the CoMP resource blocks of the first cell are resource blocks allocated to a CoMP user of the first cell; and determining, by the first cell, that a union set of CoMP coordination sets of all the CoMP resource blocks of the first cell is a CoMP coordination set of the first cell.

According to another aspect, a method for determining a CoMP coordination set is further provided. The method includes:

determining, by a second cell, CoMP resource block information of the second cell according to a resource block allocated to a CoMP user of the second cell, where the CoMP resource block information of the second cell indicates a CoMP resource block of the second cell, and a CoMP coordination set of the CoMP user of the second cell includes a first cell; and sending, by the second cell, the CoMP resource block information of the second cell to the first cell, so that the first cell obtains a CoMP coordination set of each CoMP resource block of the first cell and a CoMP coordination set of the first cell according to CoMP resource blocks of the first cell and the CoMP resource block of the second cell, where the CoMP coordination set of each CoMP resource block of the first cell is a set of the second cells including the CoMP resource block, the CoMP coordination set of the first cell is determined according to a union set of CoMP coordination sets of all the CoMP resource blocks of the first cell, and the CoMP resource blocks of the first cell are resource blocks allocated to a CoMP user of the first cell.

According to one aspect, a coordinated multi-point transmission/reception method is provided. The method includes:

receiving, by a second cell, a signal sent by a CoMP user of a first cell; and sending, by the second cell, the signal, which is sent by the CoMP user of the first cell, to the first cell according to a CoMP coordination set of each CoMP resource block of the first cell and/or a CoMP coordination set of the first cell, so that the first cell jointly detects the signal that is of the CoMP user of the first cell and sent by the second cell, where CoMP coordination sets of CoMP resource blocks of the first cell and the CoMP coordination set of the first cell are determined by using the foregoing method for determining a coordinated multi-point transmission/reception coordination set, and a CoMP coordination set of a CoMP user of the second cell includes the first cell.

According to another aspect, a coordinated multi-point transmission/reception method is further provided. The method includes:

receiving a signal sent by a CoMP user of a first cell and a signal sent by a second cell, where the signal sent by the second cell includes a signal sent by the CoMP user of the first cell and received by the second cell; and jointly detecting, according to a CoMP coordination set of each CoMP resource block of the first cell, the signal sent by the CoMP user of the first cell and the signal sent by the second cell, where CoMP coordination sets of CoMP resource blocks of the first cell and a CoMP coordination set of the first cell are determined by using the foregoing method for determining a coordinated multi-point transmission/reception coordination set, and a CoMP coordination set of a CoMP user of the second cell includes the first cell.

According to one aspect, an apparatus for determining a coordinated multi-point transmission/reception coordination set is provided. The apparatus includes:

a first receiving unit, configured to receive coordinated multi-point transmission/reception CoMP resource block information of a second cell sent by the second cell, where the CoMP resource block information of the second cell indicates a CoMP resource block of the second cell, the CoMP resource block of the second cell is a resource block allocated to a CoMP user of the second cell, and a CoMP coordination set of the CoMP user of the second cell includes a first cell;

a first obtaining unit, configured to obtain a CoMP coordination set of each CoMP resource block of the first cell according to the CoMP resource blocks of the first cell and the CoMP resource block information of the second cell received by the first receiving unit, where the CoMP coordination set of each CoMP resource block is a set of the second cells including the CoMP resource block, and the CoMP resource blocks of the first cell are resource blocks allocated to a CoMP user of the first cell; and a first determining unit, configured to determine that a union set of CoMP coordination sets, which are obtained by the first obtaining unit, of all the CoMP resource blocks of the first cell is a CoMP coordination set of the first cell.

According to another aspect, an apparatus for determining a coordinated multi-point transmission/reception coordination set is further provided. The apparatus includes:

a second determining unit, configured to determine CoMP resource block information of a second cell according to a resource block allocated to a user, who performs coordinated multi-point transmission/reception CoMP, of the second cell, where the CoMP resource block information of the second cell indicates a CoMP resource block of the second cell, and a CoMP coordination set of the CoMP user of the second cell includes a first cell; and a second sending unit, configured to send, to the first cell, the CoMP resource block information of the second cell that is determined by the second determining unit, so that the first cell obtains a CoMP coordination set of each CoMP resource block of the first cell and a CoMP coordination set of the first cell according to CoMP resource blocks of the first cell and the CoMP resource block of the second cell, where the CoMP coordination set of the CoMP resource block is a set of the second cells including the CoMP resource block, and the CoMP coordination set of the first cell is determined according to a union set of CoMP coordination sets of all the CoMP resource blocks of the first cell; and the CoMP resource blocks of the first cell are resource blocks allocated to a CoMP user of the first cell.

According to one aspect, a coordinated multi-point transmission/reception apparatus is provided. The apparatus includes:

a third receiving unit, configured to receive a signal sent by a CoMP user of a first cell; and a third sending unit, configured to send the signal, which is sent by the CoMP user of the first cell and received by the third receiving unit, to the first cell according to information about a CoMP coordination set of each CoMP resource block of the first cell and/or information about a CoMP coordination set of the first cell, so that the first cell jointly detects the signal sent by the second cell, where CoMP coordination sets of CoMP resource blocks of the first cell and the CoMP coordination set of the first cell are determined by using the foregoing method for determining a coordinated multi-point transmission/reception coordination set, and a CoMP coordination set of a CoMP user of the second cell includes the first cell.

According to another aspect, a coordinated multi-point transmission/reception apparatus is further provided. The apparatus includes:

a fourth receiving unit, configured to receive a signal sent by a CoMP user of a first cell and a signal sent by a second cell, where the signal sent by the second cell includes a signal sent by the CoMP user of the first cell and received by the second cell; and a processing unit, configured to jointly detect, according to a CoMP coordination set of each CoMP resource block of the first cell, the signal sent by the CoMP user of the first cell and the signal sent by the second cell which are received by the fourth receiving unit, where CoMP coordination sets of CoMP resource blocks of the first cell and a CoMP coordination set of the first cell are determined by using the foregoing method for determining a coordinated multi-point transmission/reception coordination set, and a CoMP coordination set of a CoMP user of the second cell includes the first cell.

The embodiments of the present invention provide a method and an apparatus for determining a CoMP coordination set, where a first cell obtains a CoMP coordination set of each CoMP resource block of the first cell according to CoMP resource blocks of the first cell and a CoMP resource block of a second cell, where the CoMP coordination set of each CoMP resource block is a set of the second cells including the CoMP resource block. The CoMP coordination set determined according to this solution is a CoMP coordination set based on a CoMP resource block, and therefore a coordination set which can help achieve a great gain during CoMP can be determined. Further, the coordination set determined based on the foregoing solution can prevent introducing a negative interference suppression gain during CoMP, and effectively increase an interference suppression gain during CoMP, thereby improving system performance.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
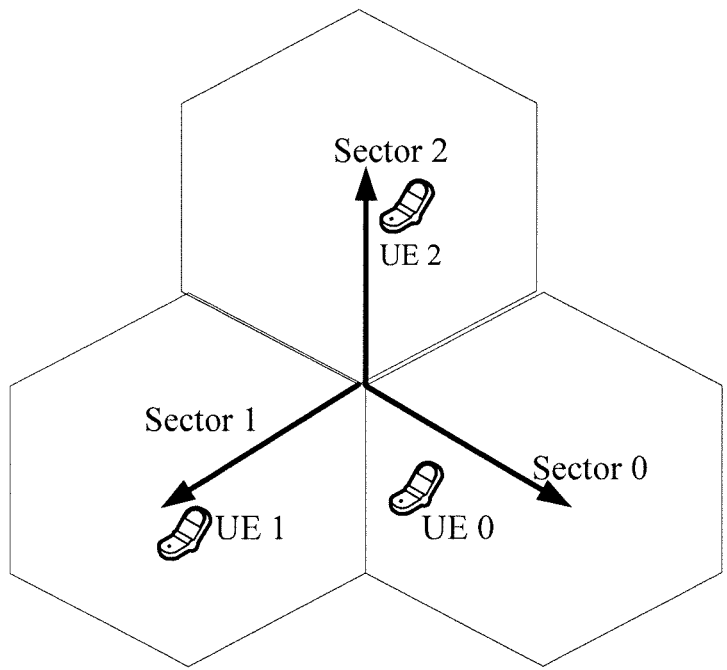
FIG. 1 is a schematic diagram of determining a CoMP coordination set in the prior art.
Figure 2:
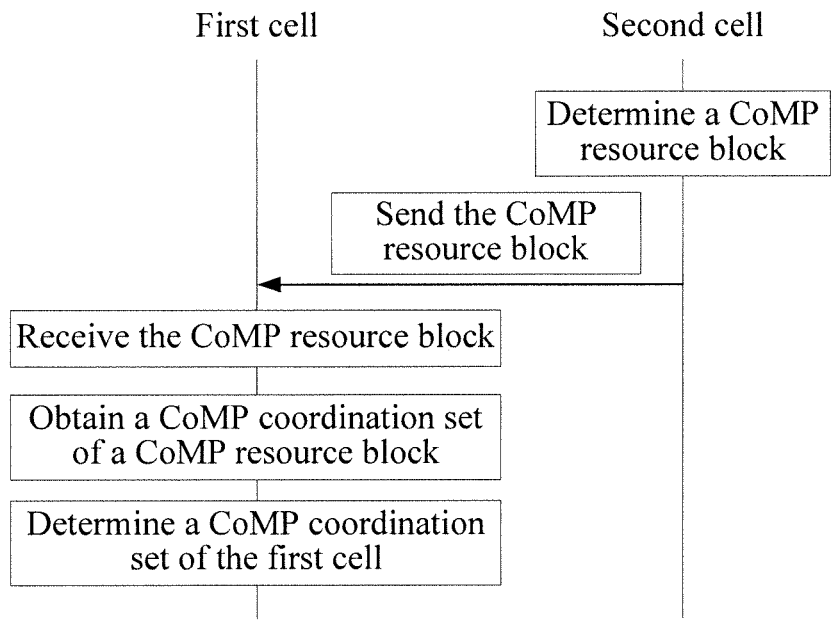
FIG. 2 is a schematic flowchart of a method for determining a CoMP coordination set according to an embodiment of the present invention.

An embodiment of the present invention provides a method for determining a CoMP coordination set. The method is applicable to an LTE or LTE-A communications system. As shown in FIG. 2, the method may include:

101: A second cell determines CoMP resource block information of the second cell according to a resource block allocated to a CoMP user of the second cell, where the CoMP resource block information of the second cell indicates a CoMP resource block of the second cell, and a CoMP coordination set of the CoMP user of the second cell includes a first cell.

The CoMP coordination set of the CoMP user of the second cell includes the first cell; therefore, the first cell is a coordination cell of the CoMP user of the second cell, and performs CoMP for the CoMP user of the second cell.

The CoMP user is a user performing coordinated multi-point transmission/reception within a coverage area of any cell, where a CoMP user of the first cell is a user performing coordinated multi-point transmission/reception within a coverage area of the first cell, and a CoMP user of the second cell is a user performing coordinated multi-point transmission/reception within a coverage area of the second cell.

A CoMP coordination set of the CoMP user includes cells performing coordinated multi-point transmission/reception for the CoMP user.

The CoMP user and the CoMP coordination set of the CoMP user may be determined according to a difference between a strength value of a signal of a serving cell received by a user in the serving cell and a strength value of a signal of another cell except the serving cell received by the user or a difference between a path loss from a user in a serving cell to the serving cell and a path loss from the user to another cell except the serving cell. A specific implementation process is the same as the described process of the prior art, and details are not repeatedly described herein in this embodiment.

Certainly, the CoMP user and the CoMP coordination set of the CoMP user may also be determined in another manner, which is not limited in the present invention.

Further, after determining the CoMP user of the second cell and the coordination set of the CoMP user, the second cell performs scheduling and resource allocation for the CoMP user of the second cell; specifically, the second cell performs resource block allocation for the CoMP user of the second cell. Then, the second cell determines CoMP resource block information of the second cell according to a resource block allocated to the CoMP user of the second cell, where the CoMP resource block information of the second cell indicates a CoMP resource block of the second cell, and the CoMP coordination set of the CoMP user of the second cell includes the first cell.

For example, the second cell may determine the CoMP resource block information of the second cell by identifying the resource block allocated to the CoMP user, or may also determine the CoMP resource block information of the second cell in another indication manner.

102: The second cell sends the CoMP resource block information of the second cell to the first cell, so that the first cell obtains a CoMP coordination set of each CoMP resource block of the first cell and a CoMP coordination set of the first cell according to CoMP resource blocks of the first cell and the CoMP resource block of the second cell.

103: The first cell receives CoMP resource block information of the second cell sent by the second cell, where CoMP resource block information of the second cell indicates a CoMP resource block of the second cell, the CoMP resource block of the second cell is a resource block allocated to a CoMP user of the second cell, and a CoMP coordination set of the CoMP user of the second cell includes the first cell.

104: The first cell obtains a CoMP coordination set of each CoMP resource block of the first cell according to CoMP resource blocks of the first cell and the CoMP resource block of the second cell, where the CoMP coordination set of each CoMP resource block is a set of the second cells including the CoMP resource block, and the CoMP resource blocks of the first cell are resource blocks allocated to a CoMP user of the first cell.

For example, the first cell may compare each CoMP resource block of the first cell with the CoMP resource block included in the second cell, to obtain a set of second cells including the same CoMP resource block, and use the set of second cells including the same CoMP resource block of the first cell as the coordination set of the same CoMP resource block.

Figure 3:
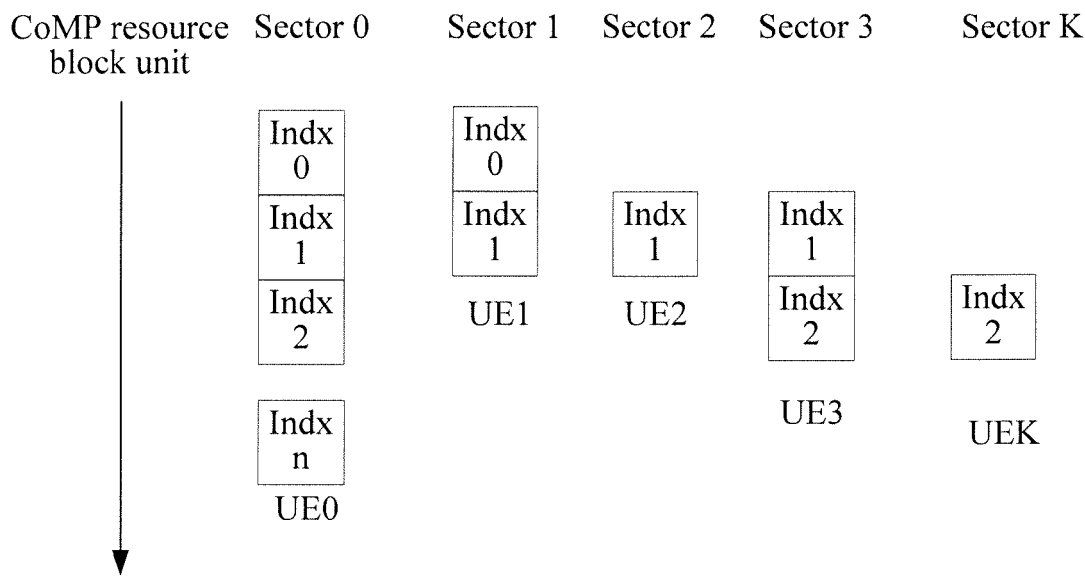
FIG. 3 is a schematic diagram of determining a CoMP coordination set of a CoMP resource block of a first cell.

As shown in FIG. 3, Sector 1, Sector 2, Sector 3 . . . Sector k are neighboring cells of Sector 0, and coordination sets of CoMP users within coverage areas of the cells Sector 1, Sector 2, Sector 3 . . . Sector k all include Sector 0. Sector 0 separately receives CoMP resource blocks of Sector 1, Sector 2, Sector 3 . . . Sector k. CoMP resource blocks of Sector 1 include {Index 0, Index 1}, a CoMP resource block of Sector 2 is {Index 1}, CoMP resource blocks of Sector 3 are {Index 1, Index 2}, a CoMP resource block of Sector k is {Index 2}, and CoMP resource blocks included in Sector 0 are {Index 0, Index 1, Index 2, Index n}. Each CoMP resource block of Sector 0 is compared with the CoMP resource blocks of Sector 1, Sector 2, Sector 3 . . . Sector k, so as to obtain a CoMP coordination set of each CoMP resource block of Sector 0. That is, a CoMP coordination set of Index 0 is {Sector 1}, a CoMP coordination set of Index 1 is {Sector 1, Sector 2}, a CoMP coordination set of Index 2 is {Sector 3, Sector k}, and a CoMP coordination set of Index n is an empty set.

105: The first cell determines that a union set of CoMP coordination sets of all the CoMP resource blocks of the first cell is a CoMP coordination set of the first cell.

For example, as shown in FIG. 3, the CoMP coordination sets of the CoMP resource blocks of Sector 0 are: the CoMP coordination set of Index 0 is {Sector 1}, the CoMP coordination set of Index 1 is {Sector 1, Sector 2}, the CoMP coordination set of Index 2 is {Sector 3, Sector k}, and the CoMP coordination set of Index n is an empty set. It is determined that a union set of the CoMP coordination sets of all the resource blocks of Sector 0 is a coordination set of the first cell; therefore, the coordination set of Sector 0 is {Sector 1, Sector 2, Sector 3, Sector k}.

Further, in order to reduce the cost of communication between cells and complexity of performing CoMP by a cell, each cell may limit a quantity of coordination cells included in a coordination set of each resource block.

After obtaining the CoMP coordination set of each CoMP resource block of the first cell, the first cell selects, according to a first preset quantity of cells included in a coordination set of a CoMP resource block, second cells of the first preset quantity from the CoMP coordination set of each CoMP resource block, and updates the CoMP coordination set of the CoMP resource block to the selected second cells.

Based on a principle of reducing a communication cost, optionally, a manner of selecting second cells of the first preset quantity from the CoMP coordination set of each CoMP resource block by the first cell may include selecting a second cell managed by a same base station which manages the first cell from the CoMP coordination set of each CoMP resource block.

In order to effectively suppress interference, the first cell uses, as far as possible, a cell where a user causing relatively strong interference to the first cell is located as a coordination cell of the first cell.

Based on this, optionally, the manner of selecting second cells of the first preset quantity from the CoMP coordination set of each CoMP resource block by the first cell may further include: selecting the second cell from the CoMP coordination set of the CoMP resource block according to a descending order of strength values of signals of the first cell received by CoMP users of the second cells; optionally, the manner of selecting second cells of the first preset quantity from the CoMP coordination set of each CoMP resource block by the first cell may further include: selecting the second cell from the CoMP coordination set of the CoMP resource block according to an ascending order of values of path losses from CoMP users of the second cells to the first cell; optionally, the manner of selecting second cells of the first preset quantity from the CoMP coordination set of each CoMP resource block by the first cell may further include: selecting the second cell from the CoMP coordination set of the CoMP resource block according to a descending order of quantities of CoMP resource blocks included in intersection sets of CoMP resource blocks of the first cell and the second cells; and optionally, the manner of selecting second cells of the first preset quantity from the CoMP coordination set of each CoMP resource block by the first cell may further include: selecting a second cell including a plurality of users from the CoMP coordination set of the CoMP resource block. The second cell including a plurality of users refers to a second cell in which CoMP resource blocks of at least two users overlap. As a coordination cell of the first cell, the second cell including a plurality of users causes great interference to the first cell.

Optionally, the first cell may select second cells of the first preset quantity in any one or a combination of the foregoing manners until the second cells of the first preset quantity are selected. For example, when second cells selected in one of the manners do not reach the first preset quantity, a second cell may be further selected in one or more of the other manners until the second cells of the first preset quantity are achieved; or it may be that a part of second cells are selected in any one of the manners and a second cell is further selected in one or more of the other manners until the second cells of the first preset quantity are achieved, which is not limited in this embodiment.

Further, in order to reduce the cost of communication between cells and complexity of performing CoMP by a cell, each cell may limit the quantity of coordination cells included in a coordination set of the cell.

After the CoMP coordination set of the first cell is determined, according to a second preset quantity of cells included in a CoMP coordination set of the first cell, if a quantity of second cells included in the CoMP coordination set of the first cell is greater than the second preset quantity, the first cell selects second cells of the second preset quantity from the CoMP coordination set of the first cell, and updates the CoMP coordination set of the first cell to the selected second cells.

Based on the principle of reducing a communication cost, optionally, a manner of selecting second cells of the second preset quantity from the CoMP coordination set of the first cell by the first cell may include: selecting a second cell managed by a same base station which manages the first cell from the CoMP coordination set of the first cell.

In order to effectively suppress interference, the first cell determines, as far as possible, that a cell where a user causing great interference to the first cell is located is a coordination cell of the first cell. Based on this, optionally, the manner of selecting second cells of the second preset quantity from the CoMP coordination set of the first cell by the first cell may further include: selecting the second cell from the CoMP coordination set of the first cell according to a descending order of strength values of signals of the first cell received by CoMP users of the second cells; optionally, the manner of selecting second cells of the second preset quantity from the CoMP coordination set of the first cell by the first cell may further include: selecting the second cell from the CoMP coordination set of the first cell according to an ascending order of values of path losses from CoMP users of the second cells to the first cell; optionally, the manner of selecting second cells of the second preset quantity from the CoMP coordination set of the first cell by the first cell may further include: selecting the second cell from the CoMP coordination set of the first cell according to a descending order of quantities of CoMP resource blocks included in intersection sets of CoMP resource blocks of the first cell and the second cells; optionally, the manner of selecting second cells of the second preset quantity from the CoMP coordination set of the first cell by the first cell may further include: selecting a second cell including a plurality of users from the CoMP coordination set of the first cell. The second cell including a plurality of users refers to a second cell in which CoMP resource blocks of at least two users overlap. As a coordination cell of the first cell, the second cell including a plurality of users causes relatively strong interference to the first cell.

The first cell may select second cells of the second preset quantity in any one or a combination of the foregoing manners until the second cells of the second preset quantity are selected. For example, when second cells selected in one of the manners do not reach the second preset quantity, a second cell may be further selected in one or more of the other manners until second cells of the second preset quantity are achieved; or it may be that a part of second cells are selected in any one of the manners and a second cell is further selected in one or more of the other manners until second cells of the second preset quantity are achieved, which is not limited in this embodiment.

For example, assuming that the second preset quantity of cells included in the CoMP coordination set of the first cell is 5, a quantity of second cells which are managed by the same base station managing the first cell and are included in the CoMP coordination set of the first cell is 2; therefore, the first cell may select the two second cells managed by the same base station which manages the first cell from the CoMP coordination set of the first cell, and then may select remaining 3 second cells according to the descending order of the strength values of the signals of the first cell received by CoMP users of the second cells, and/or according to the ascending order of the values of path losses from CoMP users of the second cells to the first cell, and/or according to the descending order of the quantities of the CoMP resource blocks included in the intersection sets of the CoMP resource blocks of the first cell and the second cells, and/or according to the method of selecting a second cell including a plurality of users.

Further, the first cell and the second cells are managed by a same base station; or the first cell and the second cells are not managed by a same base station; or the first cell and a part of the second cells are managed by a same base station, and the first cell and a part of the second cells are not managed by the same base station.

For example, cell 1, cell 2, and cell 3 are within coverage of eNodeB 1; assuming that cell 4 is within coverage of another base station, for example, eNodeB 2, cell 1, cell 2, and cell 3 may be referred to as cells managed by a same base station, and cell 1 and cell 4 are not cells managed by a same base station.

Further, the first cell may adjust an MCS (Modulation and Coding Scheme, adaptive adjustment and channel coding) for the CoMP user of the first cell according to a size of a CoMP coordination set of a CoMP resource block allocated to the CoMP user of the first cell, that is, determine parameters of the CoMP user of the first cell, such as a signal adjustment manner, a target code rate, and spectral efficiency. In this way, the first cell produces a final scheduling result, and determines, according to the scheduling result, whether to perform detection for CoMP on each resource block.

The steps of the method for the first cell and the second cell mentioned in this embodiment may be specifically executed by an eNodeB (Evolved Node B, evolved Node B) managing the first cell and an eNodeB managing the second cell.

The embodiment of the present invention provides a method for determining a CoMP coordination set, where a first cell obtains a CoMP coordination set of each CoMP resource block of the first cell according to CoMP resource blocks of the first cell and a CoMP resource block of a second cell, where the CoMP coordination set of the CoMP resource block is a set of the second cells including the CoMP resource block. The CoMP coordination set determined according to this solution is a CoMP coordination set based on a CoMP resource block, and therefore a coordination set which can help achieve a great gain during CoMP can be determined.

Figure 4:
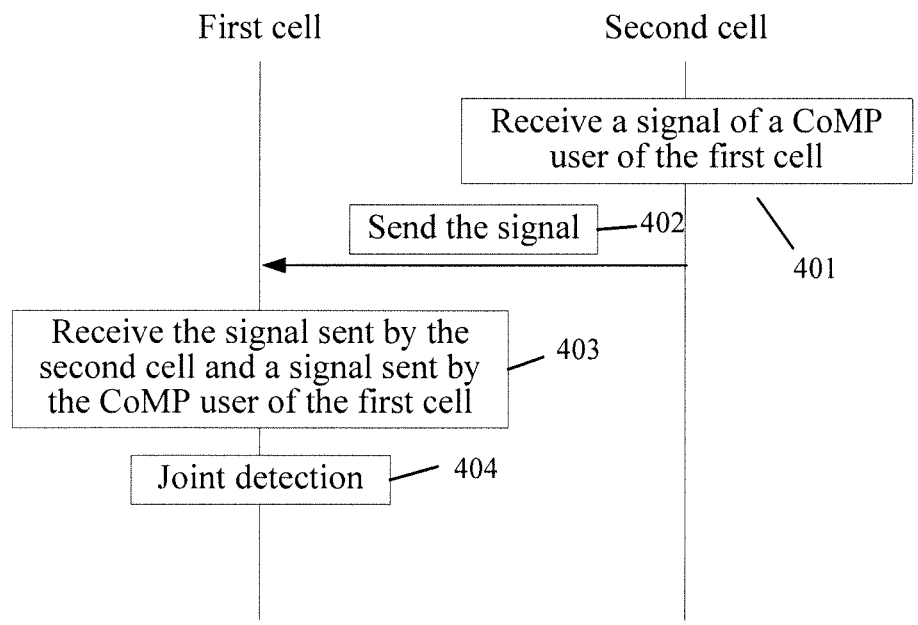
FIG. 4 is a schematic flowchart of a CoMP method according to an embodiment of the present invention.

An embodiment of the present invention provides a coordinated multi-point transmission/reception method. The method is applicable to an LTE or LTE-A communications system. As shown in FIG. 4, the method includes:

401: A second cell receives a signal sent by a CoMP user of a first cell.

Before the first cell performs CoMP for the CoMP user of the first cell, the first cell and the second cell exchange coordination set information. Specifically, the first cell sends CoMP coordination sets of CoMP resource blocks of the first cell and/or a CoMP coordination set of the first cell to the second cell, where the CoMP coordination sets of the CoMP resource blocks of the first cell or the CoMP coordination set of the first cell includes the second cell.

402: The second cell sends the signal, which is sent by the CoMP user of the first cell, to the first cell according to a CoMP coordination set of each CoMP resource block of the first cell and/or a CoMP coordination set of the first cell sent by the first cell, so that the first cell jointly detects the signal that is of the CoMP user of the first cell and sent by the second cell, where the CoMP coordination sets of the CoMP resource blocks of the first cell and the CoMP coordination set of the first cell are determined by using the method for determining a CoMP coordination set and provided in the foregoing embodiment, and a CoMP coordination set of a CoMP user of the second cell includes the first cell.

The sending, by the second cell, the signal, which is sent by the CoMP user of the first cell, to the first cell according to a CoMP coordination set of each CoMP resource block of the first cell and/or a CoMP coordination set of the first cell sent by the first cell specifically includes:

if the second cell determines that a coordination set of a CoMP resource block of the first cell includes the second cell or the second cell determines that the CoMP coordination set of the first cell includes the second cell, sending, by the second cell to the first cell, the signal sent by the CoMP user of the first cell.

Further, when the second cell sends, to the first cell, the signal sent by the CoMP user of the first cell, in order to reduce processing performed by the second cell on the signal sent by the CoMP user of the first cell, the second cell may send, to the first cell, a signal on an entire bandwidth resource of the second cell. Alternatively, the second cell may merely send, to the first cell, a signal borne on resource blocks that are allocated by the first cell to the CoMP user of the first cell, so as to reduce an overhead cost of the signal sent by the second cell. Alternatively, the second cell may also only send, to the first cell, a signal borne on a CoMP resource block of the second cell included in the coordination sets of the CoMP resource blocks that are allocated by the first cell to the CoMP user of the first cell, so as to further reduce the overhead cost of the signal sent by the second cell.

403: Receive a signal sent by a CoMP user of the first cell and a signal sent by the second cell, where the signal sent by the second cell includes a signal sent by the CoMP user of the first cell and received by the second cell.

Optionally, the first cell may receive the signal sent by the CoMP user of the first cell and the signal sent by the second cell.

Optionally, it may also be that another independent apparatus receives the signal sent by the CoMP user of the first cell and the signal sent by the second cell, to perform joint detection for the CoMP user of the first cell.

404: Jointly detect, according to a CoMP coordination set of each CoMP resource block of the first cell, the signal sent by the CoMP user of the first cell and the signal sent by the second cell, where CoMP coordination sets of CoMP resource blocks of the first cell and a CoMP coordination set of the first cell are determined by using the foregoing method for determining a CoMP coordination set, and a CoMP coordination set of a CoMP user of the second cell includes the first cell.

After the first cell or another independent apparatus receives the signal sent by the CoMP user of the first cell and the signal sent by the second cell, if the signal sent by the second cell is a signal borne on an entire bandwidth resource of the second cell or a signal borne on resource blocks that are allocated by the first cell to the CoMP user of the first cell, the first cell or the another independent apparatus processes the signal borne on the entire bandwidth resource of the second cell or the signal borne on the resource blocks allocated by the first cell to the CoMP user of the first cell, to obtain a signal borne on a CoMP resource block of the second cell included in the CoMP coordination sets of the CoMP resource blocks allocated to the CoMP user of the first cell; then the first cell or the another independent apparatus performs detection processing on the signal sent by the CoMP user of the first cell and the signal borne on the CoMP resource block of the second cell included in the CoMP coordination sets of the CoMP resource blocks allocated to the CoMP user of the first cell.

The steps of the method for the first cell and the second cell mentioned in this embodiment may be specifically executed by an eNodeB managing the first cell and an eNodeB managing the second cell.

The embodiment of the present invention provides a CoMP method, where a first cell sends information about a CoMP coordination set of a CoMP resource block of the first cell to a second cell, and the second cell determines, according to the CoMP coordination set of the CoMP resource block of the first cell, to perform CoMP for a CoMP user of the first cell; and the second cell sends, to the first cell, a signal sent by the CoMP user of the first cell, so as to perform CoMP for the CoMP user of the first cell. In this way, CoMP is performed, based on a coordination set of a resource block, for the CoMP user of the first cell, which can prevent introducing a negative interference suppression gain during CoMP, and effectively increase an interference suppression gain during CoMP, thereby improving system performance.

Figure 5:
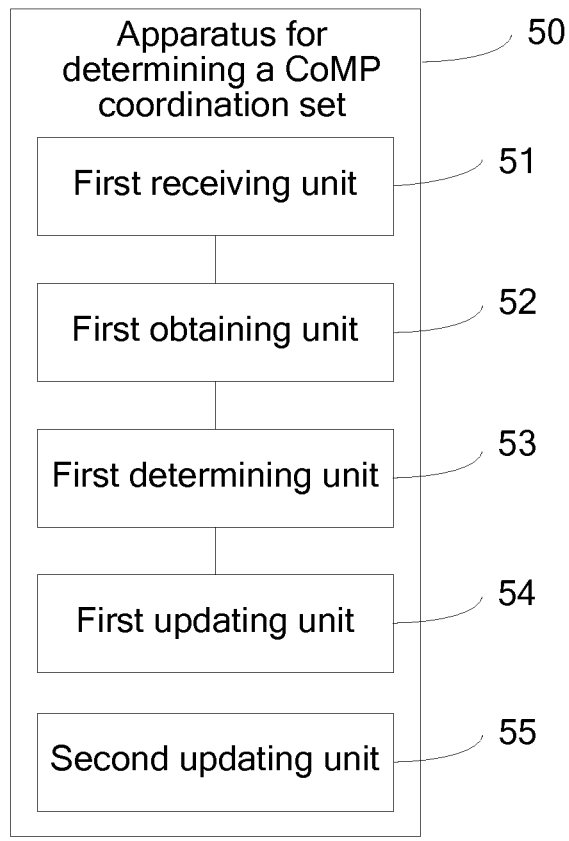
FIG. 5 is a schematic structural block diagram of an apparatus for determining a CoMP coordination set according to an embodiment of the present invention.

An embodiment of the present invention provides an apparatus 50 for determining a CoMP coordination set. The apparatus 50 is applicable to an LTE or LTE-A communications system. As shown in FIG. 5, the apparatus 50 includes a first receiving unit 51, a first obtaining unit 52, and a first determining unit 53.

The first receiving unit 51 is configured to receive coordinated multi-point transmission/reception CoMP resource block information of a second cell sent by the second cell, where the CoMP resource block information of the second cell indicates a CoMP resource block of the second cell, the CoMP resource block of the second cell is a resource block allocated to a CoMP user of the second cell, and a CoMP coordination set of the CoMP user of the second cell includes the first cell.

The CoMP coordination set of the CoMP user of the second cell includes the first cell; therefore, the first cell is a coordination cell of the CoMP user of the second cell, and performs CoMP for the CoMP user of the second cell.

The CoMP user is a user performing coordinated multi-point transmission/reception within a coverage area of any cell, where a CoMP user of the first cell is a user performing coordinated multi-point transmission/reception within a coverage area of the first cell, and a CoMP user of the second cell is a user performing coordinated multi-point transmission/reception within a coverage area of the second cell.

A CoMP coordination set of the CoMP user includes cells performing coordinated multi-point transmission/reception for the CoMP user.

The CoMP user and the CoMP coordination set of the CoMP user may be determined according to a difference between a strength value of a signal of a serving cell received by a user in the serving cell and a strength value of a signal of another cell except the serving cell received by the user or a difference between a path loss from a user in a serving cell to the serving cell and a path loss from the user to another cell except the serving cell. A specific implementation process is the same as that in the prior art, and details are not repeatedly described herein in this embodiment.

Certainly, the CoMP user and the CoMP coordination set of the CoMP user may also be determined in another manner, which is not limited in the present invention.

Further, after determining the CoMP user of the second cell and the coordination set of the CoMP user, the second cell performs scheduling and resource allocation for the CoMP user of the second cell; that is, the second cell performs resource block allocation for the CoMP user of the second cell. Then, the second cell determines CoMP resource block information of the second cell according to a resource block allocated to the CoMP user of the second cell, where the CoMP resource block information of the second cell indicates a CoMP resource block of the second cell, and the CoMP coordination set of the CoMP user of the second cell includes the first cell. The second cell sends the CoMP resource block information of the second cell to the first receiving unit 51.

For example, the second cell may determine the CoMP resource block information of the second cell by identifying the resource block allocated to the CoMP user, or may also determine the CoMP resource block information of the second cell in another indication manner.

The first obtaining unit 52 is configured to obtain a CoMP coordination set of each CoMP resource block of the first cell according to the CoMP resource blocks of the first cell and the CoMP resource block information of the second cell received by the first receiving unit 51, where the CoMP coordination set of the CoMP resource block is a set of the second cells including the CoMP resource block, and the CoMP resource blocks of the first cell are resource blocks allocated to a CoMP user of the first cell.

For example, the first obtaining unit 52 may compare each CoMP resource block of the first cell with the CoMP resource block included in the second cell, to obtain a set of second cells including the same CoMP resource block, and use the set of second cells including the same CoMP resource block of the first cell as the coordination set of the same CoMP resource block.

As shown in FIG. 3, Sector 1, Sector 2, Sector 3 . . . Sector k are neighboring cells of Sector 0, and coordination sets of CoMP users within coverage areas of the cells Sector 1, Sector 2, Sector 3 . . . Sector k include Sector 0. Sector 0 separately receives CoMP resource blocks of Sector 1, Sector 2, Sector 3 . . . Sector k. CoMP resource blocks of Sector 1 include {Index 0, Index 1}, a CoMP resource block of Sector 2 is {Index 1}, CoMP resource blocks of Sector 3 are {Index 1, Index 2}, a CoMP resource block of Sector k is {Index 2}, and CoMP resource blocks included in Sector 0 are {Index 0, Index 1, Index 2, Index n}. The first obtaining unit 52 compares each CoMP resource block of Sector 0 with the CoMP resource blocks of Sector 1, Sector 2, Sector 3 . . . Sector k, so as to obtain a CoMP coordination set of each CoMP resource block of Sector 0. That is, a CoMP coordination set of Index 0 is {Sector 1}, a CoMP coordination set of Index 1 is {Sector 1, Sector 2}, a CoMP coordination set of Index 2 is {Sector 3, Sector k}, and a CoMP coordination set of Index n is an empty set.

The first determining unit 53 is configured to determine that a union set of CoMP coordination sets, which are obtained by the first obtaining unit 52, of all the CoMP resource blocks of the first cell is a CoMP coordination set of the first cell.

For example, as shown in FIG. 3, the CoMP coordination sets, which are obtained by the first obtaining unit 52, of the CoMP resource blocks of Sector 0 are: the CoMP coordination set of Index 0 is {Sector 1}, the CoMP coordination set of Index 1 is {Sector 1, Sector 2}, the CoMP coordination set of Index 2 is {Sector 3, Sector k}, and the CoMP coordination set of Index n is an empty set. The first determining unit 53 determines that a union set of the CoMP coordination sets of all the resource blocks of Sector 0 is a coordination set of the first cell; therefore, the coordination set of Sector 0 is {Sector 1, Sector 2, Sector 3, Sector k}.

Further, in order to reduce the cost of communication between cells and complexity of performing CoMP by a cell, each cell may limit a quantity of coordination cells included in a coordination set of each resource block.

Therefore, the apparatus 50 further includes a first updating unit 54, configured to: after the first obtaining unit 52 obtains the CoMP coordination set of each CoMP resource block of the first cell, select, according to a first preset quantity of cells included in a coordination set of a CoMP resource block, second cells of the first preset quantity from the CoMP coordination set of each CoMP resource block, and update the CoMP coordination set of the CoMP resource block to the selected second cells.

Based on a principle of reducing a communication cost, optionally, the first updating unit 54 may include a first updating subunit, configured to select a second cell managed by a same base station which manages the first cell from the CoMP coordination set of each CoMP resource block.

In order to effectively suppress interference, the first cell uses, as far as possible, a cell where a user causing great interference to the first cell is located as a coordination cell of the first cell. Based on this, optionally, the first updating unit 54 may further include a second updating subunit, configured to select the second cell from the CoMP coordination set of the CoMP resource block according to a descending order of strength values of signals of the first cell received by CoMP users of the second cells. Optionally, the first updating unit 54 may further include a third updating subunit, configured to select the second cell from the CoMP coordination set of the CoMP resource block according to an ascending order of values of path losses from CoMP users of the second cells to the first cell. Optionally, the first updating unit 54 may further include a fourth updating subunit, configured to select the second cell from the CoMP coordination set of the CoMP resource block according to a descending order of quantities of CoMP resource blocks included in intersection sets of CoMP resource blocks of the first cell and the second cells. Optionally, the first updating unit 54 may further include a fifth updating subunit, configured to select a second cell including a plurality of users from the CoMP coordination set of the CoMP resource block. The second cell including a plurality of users refers to a second cell in which CoMP resource blocks of at least two users overlap. As a coordination cell of the first cell, the second cell including a plurality of users causes relatively strong interference to the first cell.

Optionally, the first updating unit 54 may include any one or a combination of the first to fifth updating subunits, to select second cells of the first preset quantity. For example, when second cells selected by using one of the updating subunits do not reach the first preset quantity, a second cell may be further selected by using one or more of the other updating subunits until the second cells of the first preset quantity are selected; or it may be that a part of the second cells are selected by using any one of the updating subunits and a second cell is further selected by using one or more of the other updating subunits until the second cells of the first preset quantity are selected, which is not limited in this embodiment.

Further, in order to reduce the cost of communication between cells and complexity of performing CoMP by a cell, each cell may limit the quantity of coordination cells included in a coordination set of the cell.

Therefore, the apparatus 50 further includes a second updating unit 55, configured to: after the first determining unit 53 determines the CoMP coordination set of the first cell, select, according to a second preset quantity of cells included in a CoMP coordination set of the first cell, second cells of the second preset quantity from the CoMP coordination set of the first cell, and update the CoMP coordination set of the first cell to the selected second cells.

Based on the principle of reducing a communication cost, optionally, the second updating unit 55 may include a sixth updating subunit, configured to select a second cell managed by the same base station which manages the first cell from the CoMP coordination set of the first cell.

In order to effectively suppress interference, the first cell determines, as far as possible, that a cell where a user causing great interference to the first cell is located is a coordination cell of the first cell. Based on this, optionally, the second updating unit 55 may further include a seventh updating subunit, configured to select the second cell from the CoMP coordination set of the first cell according to a descending order of strength values of signals of the first cell received by CoMP users of the second cells. Optionally, the second updating unit 55 may further include an eighth updating subunit, configured to select the second cell from the CoMP coordination set of the first cell according to an ascending order of values of path losses from CoMP users of the second cells to the first cell. Optionally, the second updating unit 55 may further include a ninth updating subunit, configured to select the second cell from the CoMP coordination set of the first cell according to a descending order of quantities of CoMP resource blocks included in intersection sets of CoMP resource blocks of the first cell and the second cells. Optionally, the second updating unit 55 may further include a tenth updating subunit, configured to select a second cell including a plurality of users from the CoMP coordination set of the first cell. The second cell including a plurality of users refers to a second cell in which CoMP resource blocks of at least two users overlap. As a coordination cell of the first cell, the second cell including a plurality of users causes relatively strong interference to the first cell.

Optionally, the second updating unit 55 may include any one or a combination of the sixth to tenth updating subunits, to select second cells of the second preset quantity. For example, when second cells selected by using one of the updating subunits do not reach the second preset quantity, a second cell may be further selected by using one or more of the other updating subunits until second cells of the second preset quantity are achieved; or it may be that a part of the second cells are selected by using any one of the updating subunits and a second cell is further selected by using one or more of the other updating subunits until second cells of the second preset quantity are achieved, which is not limited in this embodiment.

For example, assuming that the second preset quantity of cells included in the CoMP coordination set of the first cell is 5, a quantity of second cells which are managed by the same base station managing the first cell and are included in the CoMP coordination set of the first cell is 2; therefore, the first cell may select the two second cells managed by the same base station which manages the first cell from the CoMP coordination set of the first cell, and then may select remaining 3 second cells according to the descending order of the strength values of the signals of the first cell received by CoMP users of the second cells, and/or according to the ascending order of the values of path losses from CoMP users of the second cells to the first cell, and/or according to the descending order of the quantities of the CoMP resource blocks included in the intersection sets of the CoMP resource blocks of the first cell and the second cells, and/or according to the method of selecting a second cell including a plurality of users.

Further, the first cell and the second cells are managed by a same base station; or the first cell and the second cells are not managed by a same base station; or the first cell and a part of the second cells are managed by a same base station, and the first cell and a part of the second cells are not managed by the same base station.

For example, cell 1, cell 2, and cell 3 are within coverage of eNodeB 1; assuming that cell 4 is within coverage of another base station, for example, eNodeB 2, cell 1, cell 2, and cell 3 may be referred to as cells managed by a same base station, and cell 1 and cell 4 are not cells managed by a same base station.

Further, the apparatus 50 may specifically be an eNodeB managing the first cell.

The embodiment of the present invention provides an apparatus for determining a CoMP coordination set, where the first obtaining unit obtains, according to CoMP resource block information of a second cell received by the first receiving unit, a CoMP coordination set of each CoMP resource block of the first cell, where the CoMP coordination set of the CoMP resource block is a set of the second cells including the CoMP resource block. The CoMP coordination set determined by the apparatus is a CoMP coordination set based on a resource block of a CoMP user, and therefore a coordination set which can help achieve a great gain during CoMP can be determined.

Figure 6:
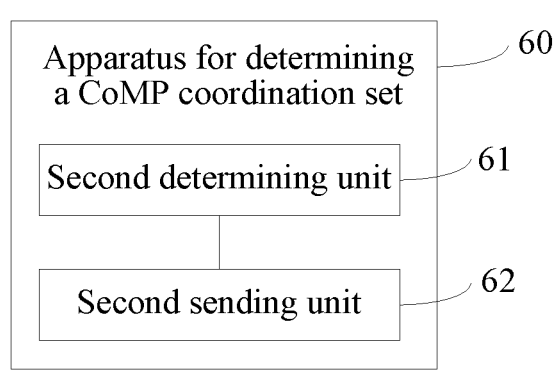
FIG. 6 is a schematic structural block diagram of an apparatus for determining a CoMP coordination set according to an embodiment of the present invention.

An embodiment of the present invention provides an apparatus 60 for determining a CoMP coordination set. The apparatus 60 is applicable to an LTE or LTE-A communications system. As shown in FIG. 6, the apparatus 60 includes a second determining unit 61 and a second sending unit 62.

The second determining unit 61 is configured to determine CoMP resource block information of a second cell according to a resource block allocated to a user, who performs coordinated multi-point transmission/reception CoMP, of the second cell, where the CoMP resource block information of the second cell indicates a CoMP resource block of the second cell, and a CoMP coordination set of the CoMP user of the second cell includes a first cell.

The CoMP coordination set of the CoMP user of the second cell includes the first cell; therefore, the first cell is a coordination cell of the CoMP user of the second cell, and performs CoMP for the CoMP user of the second cell.

The CoMP user is a user performing coordinated multi-point transmission/reception within a coverage area of any cell, where a CoMP user of the first cell is a user performing coordinated multi-point transmission/reception within a coverage area of the first cell, and a CoMP user of the second cell is a user performing coordinated multi-point transmission/reception within a coverage area of the second cell.

A CoMP coordination set of the CoMP user includes cells performing coordinated multi-point transmission/reception for the CoMP user.

The CoMP user and the CoMP coordination set of the CoMP user may be determined according to a difference between a strength value of a signal of a serving cell received by a user in the serving cell and a strength value of a signal of another cell except the serving cell received by the user or a difference between a path loss from a user in a serving cell to the serving cell and a path loss from the user to another cell except the serving cell. A specific implementation process is the same as the described process of the prior art, and details are not repeatedly described herein in this embodiment.

Certainly, the CoMP user and the CoMP coordination set of the CoMP user may also be determined in another manner, which is not limited in the present invention.

Further, after determining the CoMP user of the second cell and the coordination set of the CoMP user, the second cell performs scheduling and resource allocation for the CoMP user of the second cell; specifically, the second cell performs resource block allocation for the CoMP user of the second cell. Then the second determining unit 61 determines CoMP resource block information of the second cell according to a resource block allocated to the CoMP user of the second cell, where the CoMP resource block information of the second cell indicates a CoMP resource block of the second cell, and the CoMP coordination set of the CoMP user of the second cell includes the first cell.

For example, the second determining unit 61 may determine the CoMP resource block information of the second cell by identifying the resource block allocated to the CoMP user, or may also determine the CoMP resource block information of the second cell in another indication manner.

The second sending unit 62 is configured to send, to the first cell, the CoMP resource block information of the second cell that is determined by the second determining unit 61, so that the first cell obtains a CoMP coordination set of each CoMP resource block of the first cell and a CoMP coordination set of the first cell according to CoMP resource blocks of the first cell and the CoMP resource block of the second cell.

The CoMP coordination set of each CoMP resource block is a set of the second cells including the CoMP resource block, and the CoMP coordination set of the first cell is determined according to a union set of CoMP coordination sets of all the CoMP resource blocks of the first cell.

The CoMP resource blocks of the first cell are resource blocks allocated to a CoMP user of the first cell.

Further, the apparatus 60 may specifically be an eNodeB managing the second cell.

The embodiment of the present invention provides an apparatus for determining a CoMP coordination set, where the second determining unit determines information about a resource block of a second cell, and the second sending unit sends, to a first cell, a CoMP resource block of the second cell that is determined by the second determining unit, so that the first cell obtains a CoMP coordination set of each CoMP resource block of the first cell according to CoMP resource blocks of the first cell and the CoMP resource block of the second cell. The CoMP coordination set determined by the first cell is a CoMP coordination set based on a resource block of a CoMP user, and therefore a coordination set which can help achieve a great gain during CoMP can be determined.

Figure 7:
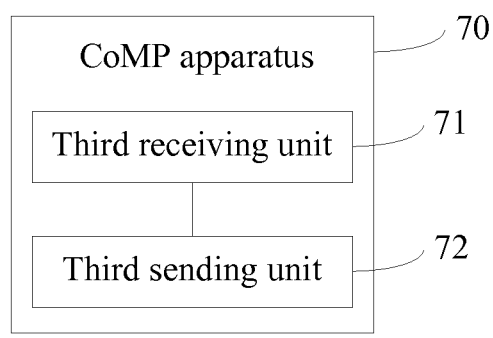
FIG. 7 is a schematic structural block diagram of a CoMP apparatus according to an embodiment of the present invention.

An embodiment of the present invention provides a CoMP apparatus 70. As shown in FIG. 7, the apparatus 70 is applicable to an LTE or LTE-A communications system. The apparatus 70 includes a third receiving unit 71 and a third sending unit 72.

The third receiving unit 71 is configured to receive a signal sent by a CoMP user of a first cell.

The third sending unit 72 is configured to send the signal, which is sent by the CoMP user of the first cell and received by the third receiving unit 71, to the first cell according to information about a CoMP coordination set of each CoMP resource block of the first cell and/or information about a CoMP coordination set of the first cell, so that the first cell jointly detects the signal sent by the second cell, where CoMP coordination sets of CoMP resource blocks of the first cell and the CoMP coordination set of the first cell are determined by using the foregoing method for determining a CoMP coordination set, and a CoMP coordination set of a CoMP user of the second cell includes the first cell.

Optionally, the third sending unit 72 is specifically configured to: if the second cell determines that a coordination set of a CoMP resource block of the first cell includes the second cell or the second cell determines that the CoMP coordination set of the first cell includes the second cell, send, to the first cell, the signal sent by the CoMP user of the first cell and received by the third receiving unit 71.

Further, in order to reduce processing performed by the second cell on the signal sent by the CoMP user of the first cell, the third sending unit 73 may send, to the first cell, a signal on an entire bandwidth resource of the second cell. Alternatively, the third sending unit 73 may also only send, to the first cell, a signal borne on resource blocks that are allocated by the first cell to the CoMP user of the first cell, so as to reduce an overhead cost of the signal sent by the second cell. Alternatively, the third sending unit 73 may also only send, to the first cell, a signal borne on a CoMP resource block of the second cell included in the coordination sets of the CoMP resource blocks that are allocated by the first cell to the CoMP user of the first cell, so as to further reduce the overhead cost of the signal sent by the second cell.

Further, the CoMP user of the first cell is a user performing coordinated multi-point transmission/reception within a coverage area of the first cell, and the CoMP user of the second cell is a user performing coordinated multi-point transmission/reception within a coverage area of the second cell.

Further, the apparatus 70 may be an eNodeB managing the second cell.

The embodiment of the present invention provides a CoMP apparatus, where after the third receiving unit receives a signal sent by a CoMP user of a first cell, the third sending unit may send the signal, which is sent by the CoMP user of the first cell, to the first cell according to information about a CoMP coordination set of each CoMP resource block of the first cell and/or information about a CoMP coordination set of the first cell, so that the first cell performs CoMP for the CoMP user. In this way, CoMP is performed, based on a coordination set of a resource block, for the CoMP user of the first cell, which can prevent introducing a negative interference suppression gain during CoMP, and effectively increase an interference suppression gain during CoMP, thereby improving system performance.

Figure 8:
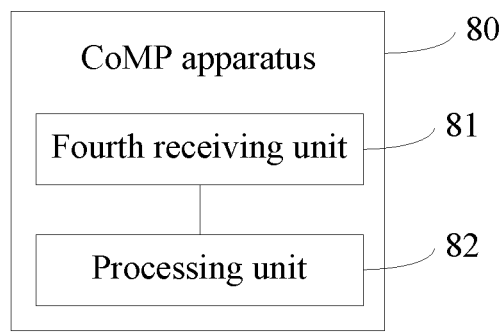
FIG. 8 is a schematic structural block diagram of a CoMP apparatus according to an embodiment of the present invention.

An embodiment of the present invention provides a CoMP apparatus 80. As shown in FIG. 8, the apparatus 80 is applicable to an LTE or LTE-A communications system. The apparatus 80 includes a fourth receiving unit 81 and a processing unit 82.

The fourth receiving unit 81 is configured to receive a signal sent by a CoMP user of a first cell and a signal sent by a second cell, where the signal sent by the second cell includes a signal sent by the CoMP user of the first cell and received by the second cell.

After the first cell determines information about a CoMP coordination set of each CoMP resource block of the first cell and a CoMP coordination set of the first cell by using the method described in the foregoing embodiment for determining a CoMP coordination set, the first cell and the second cell exchange coordination set information. The first cell sends information about the CoMP coordination set of each CoMP resource block of the first cell and/or information about the CoMP coordination set of the first cell to the second cell, and the second cell sends the signal, which is sent by the CoMP user of the first cell, to the first cell according to the information about CoMP coordination sets of CoMP resource blocks of the first cell or the information about the CoMP coordination set of the first cell.

In order to reduce processing performed by the second cell on the signal sent by the CoMP user of the first cell, the signal sent by the second cell and received by the fourth receiving unit 81 may be a signal on an entire bandwidth resource of the second cell.

The signal sent by the second cell and received by the fourth receiving unit 81 may be a signal borne on resource blocks that are allocated by the first cell to the CoMP user of the first cell, so as to reduce an overhead cost of the signal sent by the second cell. Alternatively, the signal sent by the second cell and received by the fourth receiving unit 81 may be a signal borne on a CoMP resource block of the second cell included in the coordination sets of the CoMP resource blocks that are allocated by the first cell to the CoMP user of the first cell, so as to further reduce the overhead cost of the signal sent by the second cell.

The processing unit 82 is configured to jointly detect, according to a CoMP coordination set of each CoMP resource block of the first cell, the signal sent by the CoMP user of the first cell and the signal sent by the second cell which are received by the fourth receiving unit 81, where CoMP coordination sets of CoMP resource blocks of the first cell and a CoMP coordination set of the first cell are determined by using the foregoing method for determining a CoMP coordination set, and a CoMP coordination set of a CoMP user of the second cell includes the first cell.

After the fourth receiving unit 81 receives the signal sent by the CoMP user of the first cell and the signal sent by the second cell, if the signal sent by the second cell is a signal borne on an entire bandwidth resource of the second cell or a signal borne on resource blocks that are allocated by the first cell to the CoMP user of the first cell, the processing unit 82 processes the signal borne on the entire bandwidth resource of the second cell or the signal borne on the resource blocks allocated by the first cell to the CoMP user of the first cell, to obtain a signal borne on a CoMP resource block of the second cell included in the CoMP coordination sets of the CoMP resource blocks allocated to the CoMP user of the first cell, and then performs detection processing on the signal sent by the CoMP user of the first cell and the signal borne on the CoMP resource block of the second cell included in the CoMP coordination sets of the CoMP resource blocks allocated to the CoMP user of the first cell.

Further, the apparatus 80 may be an eNodeB managing the first cell, or may also be another independent apparatus which receives and jointly detects signals of the first cell and the second cell for coordinated multi-point transmission/reception.

The embodiment of the present invention provides a CoMP apparatus, where the fourth receiving unit receives a signal sent by a CoMP user of a first cell and a signal sent by a second cell, where the signal sent by the second cell includes a signal sent by the CoMP user of the first cell to the second cell, and the processing unit jointly detects, according to a CoMP coordination set of a CoMP resource block of the first cell, the signals received by the fourth receiving unit. In this way, CoMP is performed, based on a coordination set of a resource block, for the CoMP user of the first cell, which can prevent introducing a negative interference suppression gain during CoMP, and effectively increase an interference suppression gain during CoMP, thereby improving system performance.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining a coordinated multi-point (CoMP) transmission/reception coordination set, wherein the method comprises:

receiving, by a first cell, CoMP resource block information of a second cell which is sent by the second cell and indicates a CoMP resource block of the second cell which is a resource block allocated to a CoMP user of the second cell, wherein the CoMP user of the second cell uses the first cell for CoMP with the CoMP resource block of the second cell;

obtaining, by the first cell, CoMP coordination sets corresponding to each CoMP resource block of the first cell from among CoMP resource blocks of the first cell according to the CoMP resource blocks of the first cell and the CoMP resource block of the second cell, wherein each CoMP coordination set corresponding to a CoMP resource block from among the CoMP resource blocks of the first cell is a set of second cells comprising the CoMP resource block of the first cell, and the CoMP resource blocks of the first cell are resource blocks allocated to a CoMP user of the first cell; and determining, by the first cell, that a union set of the CoMP coordination sets of the first cell is a CoMP coordination set of the first cell.

2. The method according to claim 1, after the obtaining, by the first cell, a CoMP coordination set of each CoMP resource block of the first cell, further comprising:

selecting, by the first cell, second cells of a first preset quantity from the CoMP coordination set of each CoMP resource block of the first cell, and updating the CoMP coordination set of each CoMP resource block of the first cell to the selected second cells, wherein the first cell selects, until the second cells of the first preset quantity are selected, a second cell from the CoMP coordination set of each CoMP resource block of the first cell in at least one of the following manners:

selecting a second cell managed by a same base station which manages the first cell from the CoMP coordination set of each CoMP resource block of the first cell;

selecting a second cell from the CoMP coordination set of the CoMP resource block of the first cell according to a descending order of strength values of signals of the first cell received by CoMP users of the second cells;

selecting a second cell from the CoMP coordination set of the CoMP resource block of the first cell according to an ascending order of values of path losses from CoMP users of the second cells to the first cell;

selecting a second cell from the CoMP coordination set of the CoMP resource block of the first cell according to a descending order of quantities of CoMP resource blocks comprised in intersection sets of CoMP resource blocks of the first cell and the second cells; and selecting a second cell comprising a plurality of users from the CoMP coordination set of the CoMP resource block of the first cell.

3. The method according to claim 1, after the determining, by the first cell, that a union set of CoMP coordination sets of all the CoMP resource blocks of the first cell is a CoMP coordination set of the first cell, further comprising:

selecting, by the first cell, second cells of a second preset quantity from the CoMP coordination set of the first cell, and updating the CoMP coordination set of the first cell to the selected second cells of the second preset quantity, wherein the first cell selects, until the second cells of the second preset quantity are selected, a second cell from the CoMP coordination set of the first cell in at least one of the following manners:

selecting a second cell managed by a same base station which manages the first cell from the CoMP coordination set of the first cell;

selecting a second cell from the CoMP coordination set of the first cell according to a descending order of strength values of signals of the first cell received by CoMP users of the second cells;

selecting a second cell from the CoMP coordination set of the first cell according to an ascending order of values of path losses from CoMP users of the second cells to the first cell;

selecting a second cell from the CoMP coordination set of the first cell according to a descending order of quantities of CoMP resource blocks comprised in intersection sets of CoMP resource blocks of the first cell and CoMP resource blocks of the second cells; and selecting a second cell comprising a plurality of users from the CoMP coordination set of the first cell.

4. The method according to claim 1, wherein the first cell and the second cells are managed by a same base station; or the first cell and the second cells are not managed by a same base station; or the first cell and a part of the second cells are managed by a same base station, and the first cell and a part of the second cells are not managed by the same base station.

5. The method according to claim 1, wherein the CoMP user of the first cell is a user performing coordinated multi-point transmission/reception within a coverage area of the first cell, and the CoMP user of the second cell is a user performing coordinated multi-point transmission/reception within a coverage area of the second cell.

6. An apparatus for determining a coordinated multi-point (CoMP) transmission/reception coordination set, wherein the apparatus comprises:

a first receiving unit, configured to receive CoMP resource block information of a second cell which is sent by the second cell and indicates a CoMP resource block of the second cell which is a resource block allocated to a CoMP user of the second cell, wherein the CoMP user of the second cell uses the first cell for CoMP with the CoMP resource block of the second cell;

a first obtaining unit, configured to obtain CoMP coordination sets corresponding to each CoMP resource block of the first cell from among CoMP resource blocks of the first cell according to the CoMP resource blocks of the first cell and the CoMP resource block information of the second cell received by the first receiving unit, wherein each CoMP coordination set corresponding to a CoMP resource block from among the CoMP resource blocks of the first cell is a set of the second cells comprising the CoMP resource block of the first cell, and the CoMP resource blocks of the first cell are resource blocks allocated to a CoMP user of the first cell; and a first determining unit, configured to determine that a union set of the CoMP coordination sets, which are obtained by the first obtaining unit, of all the CoMP resource blocks of the first cell is a CoMP coordination set of the first cell.

7. The apparatus according to claim 6, wherein the apparatus further comprises a first updating unit, configured to: after the first obtaining unit obtains the CoMP coordination set of each CoMP resource block of the first cell, select, according to a first preset quantity of cells comprised in a coordination set of a CoMP resource block, second cells of the first preset quantity from the CoMP coordination set of each CoMP resource block, and update the CoMP coordination set of the CoMP resource block to the selected second cells, wherein:

the first updating unit is configured to perform at least one of the following until the second cells of the first preset quantity are selected:

select a second cell managed by a same base station which manages the first cell from the CoMP coordination set of each CoMP resource block;

select the second cell from the CoMP coordination set of the CoMP resource block according to a descending order of strength values of signals of the first cell received by CoMP users of the second cells;

select the second cell from the CoMP coordination set of the CoMP resource block according to an ascending order of values of path losses from CoMP users of the second cells to the first cell;

select the second cell from the CoMP coordination set of the CoMP resource block according to a descending order of quantities of CoMP resource blocks comprised in intersection sets of CoMP resource blocks of the first cell and the second cells; and select a second cell comprising a plurality of users from the CoMP coordination set of the CoMP resource block.

8. The apparatus according to claim 6, wherein the apparatus further comprises: a second updating unit, configured to: after the first determining unit determines the CoMP coordination set of the first cell, select, according to a second preset quantity of cells comprised in a CoMP coordination set of the first cell, second cells of the second preset quantity from the CoMP coordination set of the first cell, and update the CoMP coordination set of the first cell to the selected second cells, wherein the second updating unit is configured to perform at least one of the following until the second cells of the second preset quantity are selected:

select a second cell managed by a same base station which manages the first cell from the CoMP coordination set of the first cell;

select the second cell from the CoMP coordination set of the first cell according to a descending order of strength values of signals of the first cell received by CoMP users of the second cells;

select the second cell from the CoMP coordination set of the first cell according to an ascending order of values of path losses from CoMP users of the second cells to the first cell;

select the second cell from the CoMP coordination set of the first cell according to a descending order of quantities of CoMP resource blocks comprised in intersection sets of CoMP resource blocks of the first cell and the second cells; and select a second cell comprising a plurality of users from the CoMP coordination set of the first cell.

9. The apparatus according to claim 6, wherein the first cell and the second cells are managed by a same base station; or the first cell and the second cells are not managed by a same base station; or the first cell and a part of the second cells are managed by a same base station, and the first cell and a part of the second cells are not managed by the same base station.

10. The apparatus according to claim 6, wherein the CoMP user of the first cell is a user performing coordinated multi-point transmission/reception within a coverage area of the first cell, and the CoMP user of the second cell is a user performing coordinated multi-point transmission/reception within a coverage area of the second cell.

11. A coordinated multi-point transmission/reception apparatus managing a second cell, wherein the apparatus comprises:

a third receiving unit, configured to receive a signal sent by a CoMP user of a first cell; and a third sending unit, configured to send the signal, which is sent by the CoMP user of the first cell and received by the third receiving unit, to the first cell according to information about a CoMP coordination set of each CoMP resource block of the first cell and/or information about a CoMP coordination set of the first cell, so that the first cell jointly detects the signal sent by third sending unit of the second cell, wherein:

CoMP coordination sets of CoMP resource blocks of the first cell and the CoMP coordination set of the first cell are determined by:

receiving, by the first cell, CoMP resource block information of the second cell which is sent by the second cell and indicates a CoMP resource block of the second cell which is a resource block allocated to a CoMP user of the second cell, wherein the CoMP user of the second cell uses the first cell for CoMP with the CoMP resource block of the second cell;

obtaining, by the first cell, CoMP coordination sets corresponding to each CoMP resource block of the first cell from among CoMP resource blocks of the first cell according to the CoMP resource blocks of the first cell and the CoMP resource block of the second cell, wherein each CoMP coordination set corresponding to a CoMP resource block from among the CoMP resource blocks of the first cell is a set of second cells comprising the CoMP resource block of the first cell, and the CoMP resource blocks of the first cell are resource blocks allocated to a CoMP user of the first cell; and determining, by the first cell, that a union set of the CoMP coordination sets of the first cell is a CoMP coordination set of the first cell.

12. The apparatus according to claim 11, wherein the third sending unit is specifically configured to: upon the second cell determining that a coordination set of a CoMP resource block of the first cell comprises the second cell or the second cell determines that the CoMP coordination set of the first cell comprises the second cell, send, to the first cell, the signal sent by the CoMP user of the first cell and received by the third receiving unit.

13. The apparatus according to claim 11, wherein the sending, by the third sending unit to the first cell, the signal sent by the CoMP user of the first cell comprises: sending, to the first cell, a signal on an entire bandwidth resource of the second cell; or sending, to the first cell, a signal borne on resource blocks that are allocated by the first cell to the CoMP user of the first cell; or sending, to the first cell, a signal borne on a CoMP resource block of the second cell comprised in the coordination sets of the CoMP resource blocks that are allocated by the first cell to the CoMP user of the first cell.

14. The apparatus according to claim 11, wherein the CoMP user of the first cell is a user performing coordinated multi-point transmission/reception within a coverage area of the first cell, and the CoMP user of the second cell is a user performing coordinated multi-point transmission/reception within a coverage area of the second cell.

* * * * *